United States Patent
Pudenz

(10) Patent No.: US 10,950,923 B2
(45) Date of Patent: Mar. 16, 2021

(54) ANTENNA FOR AN RFID READER AND METHOD FOR IDENTIFYING A ROLL

(71) Applicant: SICK AG, Waldkirch (DE)

(72) Inventor: Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/784,706

(22) Filed: Feb. 7, 2020

(65) Prior Publication Data

US 2020/0259238 A1    Aug. 13, 2020

(30) Foreign Application Priority Data

Feb. 8, 2019    (DE) .................. 10 2019 103 102.8

(51) Int. Cl.
  *G08B 13/14*   (2006.01)
  *H01Q 1/22*    (2006.01)
  *G06K 19/07*   (2006.01)

(52) U.S. Cl.
  CPC ....... *H01Q 1/2208* (2013.01); *G06K 19/0723* (2013.01)

(58) Field of Classification Search
  None
  See application file for complete search history.

(56) References Cited

U.S. PATENT DOCUMENTS

| | | | |
|---|---|---|---|
| 4,083,051 A | 4/1978 | Woodward | |
| 2005/0200528 A1* | 9/2005 | Carrender | H01Q 9/045 343/700 MS |
| 2006/0220962 A1* | 10/2006 | d'Hont | H01Q 1/523 343/700 MS |
| 2007/0001916 A1* | 1/2007 | King | G06K 19/0716 343/718 |
| 2009/0179816 A1 | 7/2009 | Chen et al. | |
| 2017/0255853 A1* | 9/2017 | Pudenz | H01Q 7/005 |
| 2017/0373373 A1 | 12/2017 | Tsuchida et al. | |
| 2018/0247177 A1* | 8/2018 | Pudenz | H01Q 21/24 |

FOREIGN PATENT DOCUMENTS

| | | |
|---|---|---|
| DE | 202006020103 U1 | 11/2007 |
| EP | 3217472 A1 | 9/2017 |
| EP | 3339225 A1 | 6/2018 |
| EP | 3367504 A1 | 8/2018 |
| JP | 201625480 A | 2/2016 |
| WO | 2016207125 A2 | 12/2016 |
| WO | 2018180873 A1 | 10/2018 |
| WO | 2018180875 A1 | 10/2018 |

OTHER PUBLICATIONS

Huang, John; "A Technique for an Array to Generate Circular Polarization with Linearly Polarized Elements"; IEEE Transactions on Antennas and Propagation; vol. AP-34, No. 9; Sep. 1986.

* cited by examiner

*Primary Examiner* — Julie B Lieu
(74) *Attorney, Agent, or Firm* — Nath, Goldberg & Meyer; Jerald L. Meyer

(57) ABSTRACT

An antenna (10) for an RFID reader, the antenna (10) comprising at least two linearly polarized individual antennas (24*a-b*) and a feed circuit (26) which is connected to the individual antennas (24*a-b*), wherein the individual antennas (24*a-b*) are arranged relative to one another with a tilt of an internal angle and together form a circularly polarized antenna, and wherein the antenna (10) has a free space (30) in a region of the internal angle.

11 Claims, 5 Drawing Sheets

ANTENNA FOR AN RFID READER AND METHOD FOR IDENTIFYING A ROLL

FIELD

The invention relates to an antenna for an RIFD reader and a method for identifying a roll.

BACKGROUND

RFID readers are used to automatically identify objects by reading RFID transponders. Via its antenna, the RFID reader uses electromagnetic radiation to stimulate RFID transponders in its reading range to transmit the stored information, receives the corresponding transponder signals and evaluates them. The UHF frequency range (ultra high frequency) is often used for this purpose, as there exists an established framework in the ISO 18000-6 standard and, in addition, transponders can be read at distances ranging from a few millimeters to several meters.

Standard antennas cannot be used in all of the various RFID applications. An example of an application requiring a special antenna is a packaging machine. In that machine, a so-called mandrel serves as a holder for individual rolls of the raw material for the packaging. The raw material itself is wound on a paper roll, which unwinds on the mandrel. An RFID transponder is attached to the inside of the paper roll, which is to be read in order to identify the respective roll of raw material.

The difficulty lies in identifying the rolls immediately after they have been inserted into the packaging machine. At this point in time, the orientation of the roll and thus the position of the RFID transponder is undefined. The axial position can be determined by arrangement in that the RFID transponder is always placed at a certain distance from the side opening. However, the position in the circumferential direction depends on the insertion process, which for practical purposes is random. If the roll is to be identified before it moves, is needs to be possible to read the RFID transponder at any conceivable angle by the antenna and the connected RFID reader, respectively.

The antenna can be placed directly in the vicinity of the roll, for example in a holder of the mandrel, so that the distance between the antenna and the RFID transponder remains short. However, restrictions in the radio path caused by metallic objects, such as a metallic shaft of the mandrel and metallic layers of the packaging material, complicate communication. An optimization of the position or an alignment of the transponder is not possible due to the general conditions in the packaging machine. The transmission power can only be increased to a limited extent. This is because, on the one hand, the transmission power for RFID applications is limited in general, and on the other hand it has to be ensured that only the RFID transponder of the desired roll and not of an adjacent roll is read in case of having more than one roll.

In a conventional solution for the example application at the packaging machine, two orthogonally arranged, linearly polarized dipole antennas are used as antennas, which are coupled to one another via a Wilkinson power divider. The combination of the two elements again results in a linearly polarized radiation.

FIG. 8 shows an example of the signal level (RSSI, Received Signal Strength Indication) as a function of the angular position of the transponder depending on the rotational position of the roll. Very pronounced minima can be seen in unfavorable angular positions, where the metal shaft or the wound metal layer block the RFID transponder. At these angular positions, the RFID transponder cannot be read correctly. Communication breaks down because the attenuation on the radio link is so strong that either the RFID transponder no longer receives enough energy to wake up, or the signal level of the RFID transponder's response is so small that the RFID reader can no longer evaluate it.

Independent of the above example application for identification of a roll in a packaging machine, numerous other antenna forms are known in the prior art. So-called inverted-F antennas are installed in many compact and mobile devices. These antennas got their name because of their F-shape. The transverse bars of the F are formed by the feed line and an additional lateral short circuit connection to the ground plane, the main bar is the actual antenna arm. A common, particularly flat and compact design is the so-called PIF antenna (PIFA, planar inverted-F antenna), which can be integrated as a patch antenna in microstrip technology directly on a printed circuit board.

EP 3 367 504 A1 discloses an antenna for an RFID reader with four inverted-F antennas that are driven by a feed circuit at a phase offset for circular polarization. However, this is an example of a standard design that is not usable for the special application described above. In addition, the feed circuit must be relatively complex due to the phase shift. A similar solution is known from EP 3 217 472 A1, which uses a capacitive loaded loop (CLL) instead of inverted-F antennas. This difference does not remedy the mentioned disadvantages.

US 2009/0179816 A1 describes an antenna system with two PIFAs which are arranged in a plane and at a right angle to one another at their base points. One of the PIFAs is driven with a phase shift of 90° in order to generate circularly polarized waves. Control with a phase shift requires a correspondingly complex feed network. With the opposite orientation, i.e. the fact that both PIFAs point away from the common base point, still no good circular polarization is achieved. In addition, an antenna in this design could not be mounted in the mentioned application on a packaging machine for mechanical reasons. JP 2016/025480 A shows a related antenna configuration whose ground plane construction does not allow mounting in the packaging machine. Further examples of documents with a circularly polarized antenna having a plurality of inverted-F antennas and comparable disadvantages are WO 2018/180873 A1 or WO 2018/180875 A1.

In the article of Huang, John, "A technique for an array to generate circular polarization with linearly polarized elements." IEEE Transactions on antennas and propagation 34.9 (1986): 1113-1124, circularly polarized fields generated by combining several linearly polarized antenna elements are discussed. However, this remains on a rather basic level without deeper attention to specific designs, and as far as antenna arrangements are described, these are matrix configurations which could not be accommodated in the application discussed above.

SUMMARY

It is therefore an object of the invention to provide an improved antenna for an RFID reader.

This object is satisfied by an antenna for an RFID reader, the antenna comprising at least two linearly polarized individual antennas and a feed circuit which is connected to the individual antennas, wherein the individual antennas are arranged relative to one another with a tilt of an internal angle and together form a circularly polarized antenna, and wherein the antenna has a free space in a region of the internal angle.

The antenna has at least two linearly polarized individual antennas which are connected to a feed circuit. The individual antennas are tilted in relation to each other, thus practically forming the legs of an angle called the inner angle. Together, the individual antennas generate a circular polarization. This also includes elliptical polarization with a sufficiently small axial ratio.

The invention starts from the basic idea of at least partially keeping the area of the inner angle enclosed by the two legs free. Consequently, an empty or free space is left there, wherein another object can be located. This is in particular done in view of the packaging machine application discussed above where the roll is at least partially arranged in the free space. Conventional antennas would have their ground plane or additional individual antennas instead of the free space, which means that an object such as the roll could only be positioned opposite the antenna in an unfavorable arrangement or at a distance.

The invention has the advantage that a circularly polarized antenna is provided which is particularly suitable for reading RFID transponders of unknown orientation. The fluctuation of the signal level shown in FIG. 8, which depends on the angular position, is thus significantly reduced. There are no longer interruptions of the connection, the RFID transponder can be read at any angle. Due to the design of the antenna including the free space, a close mounting to an object like a roll with packaging material is possible, which is located in the free space. Under the given boundary conditions, a high antenna gain and a low axis ratio are achieved, allowing communication at least across the free space and, for example, across the roll in any angular position.

The object is also satisfied by an apparatus with an RFID reader and with a holder for a roll, wherein the holder has at least one antenna which is connected to the RFID reader in order to read an RFID transponder of the roll held by the holder and thus identify the roll, wherein the antenna comprises at least two linearly polarized individual antennas and a feed circuit which is connected to the individual antennas, wherein the individual antennas are arranged relative to one another with a tilt of an internal angle and together form a circularly polarized antenna, and wherein the antenna has a free space in a region of the internal angle.

The roll is preferably at least partially arranged in the free space. Throughout this specification, the terms preferred or preferably refer to an advantageous, but completely optional feature. The RFID reader uses the antenna to send RFID signals to an RFID transponder and/or to receive RFID signals from an RFID transponder. The RFID reader has an evaluation unit for encoding RFID information into the RFID signals and/or for reading RFID information from the RFID signals. An RFID transponder on a roll located in the holder can be read regardless of its rotational position. The holder and the roll may have metallic parts that affect the radio link. The advantage of the circularly polarized antenna according to the invention is that the RFID transponder can also be read prior to a rotational movement or during a fast rotational movement. With conventional antennas, the communication link would break off in unfavorable rotational positions such as the minima in FIG. 8. The antenna according to the invention can be adapted to different form factors and thus be used in different apparatuses.

The object is again satisfied by a method for identifying a roll arranged on a mandrel of a holder, wherein an RFID transponder of the roll is read by an RFID reader by means of an antenna of the holder independently of the rotational position of the roll, the antenna comprising at least two linearly polarized individual antennas and a feed circuit which is connected to the individual antennas, wherein the individual antennas are arranged relative to one another with a tilt of an internal angle and together form a circularly polarized antenna, and wherein the antenna has a free space in a region of the internal angle.

In the method according to the invention, a roll is identified which is arranged on a mandrel of a holder, wherein an RFID transponder of the roll is read by an RFID reader by means of an antenna of the holder according to the invention, independently of the rotational position of the roll, in particular without the roll rotating or before the roll rotates. This would not be possible with a conventional antenna, at least in some of the rotational positions shown in FIG. 8.

The inner angle preferably is a right angle. A tolerance range of at least a few degrees, for example an angular range of 80°-100°, preferably is still included. A right angle promises the lowest axis ratio, with small angle deviations worsening this only gradually.

The antenna preferably is arranged in an L-shaped housing whose legs form the inner angle. Such a housing for example at the same time is used as a holder for the mandrel or can be connected to such a holder. The L-angle is preferably a right angle, but an at least slightly deformed L-shape with a different inner angle is also conceivable.

The antenna preferably comprises at least one additional linearly polarized individual antenna at an angle smaller than the internal angle to the two individual antennas. The additional individual antenna can further improve the circular polarization. Preferably the inner angle is divided into equal parts. For example, if two individual antennas are at right angles to each other, a third individual antenna is at an angle of 45°.

The additional individual antenna preferably is arranged between the two individual antennas. In the case of an L-shape, this would be the position approximately at the tip. In this position, the additional individual antenna complements the two individual antennas as continuously as possible, both by its position and preferably by its angle.

The individual antennas preferably are jointly aligned clockwise or jointly aligned counterclockwise. The individual antennas in their linear direction corresponding to their linear polarization have a structure which also allows a mirrored alignment. This preferred embodiment avoids mixing mirrored and non-mirrored individual antennas. The individual antennas could therefore be transformed into each other without mirroring by moving them along a line following the inner angle. In yet other words, the individual antennas are aligned in the direction of rotation of the circular polarization.

The feed circuit preferably drives the individual antennas in phase. This is very surprising in connection with a circular polarization generated by linearly polarized individual antennas, which conventionally are always driven with a phase shift corresponding to their different angular orientation. However, the inventors found out that with the alignment of the individual antennas described in the previous paragraph, an additional phase shift of the individual signals is not necessary and is even detrimental to the axial ratio. Therefore, preferably no phase shifters, diversion lines or similar components for generating a phase shift are part of the feed circuit, and the costs for space and complexity of the feed circuit can be reduced accordingly.

The individual antennas preferably are antennas of the inverted-F antenna type as briefly described in the introduction. Such individual antennas are F-shaped, with the main vertical bar of the F forming a monopole antenna, but with an additional short circuit as an upper cross bar of the F next to a feed point at the lower cross bar of the F. For these specific individual antennas, the orientation explained in the previous paragraphs is based on the F-shape, which preferably is not mirrored for any of the individual antennas with respect to the others. The base of the F-shape is preferably oriented in the common direction of rotation of the circular polarization.

The individual antennas preferably are PIFA antennas (Planar Inverted-F Antenna). Thus the structures of the individual antennas are formed by microstrips on a printed circuit board (patch antenna). The specific shape of such PIFA antennas can be designed very variably on the surface of the printed circuit board, even including the board structure in layers, depth direction, or on the backside. For example, the short-circuit line can be located on the backside of the circuit board behind the feed point in order to reduce the required space. In general, there are many degrees of freedom for the design of the individual antennas and the design of the antenna as a whole, as well as for a housing or other components where the antenna is to be integrated.

The apparatus according to the invention preferably is configured as a packaging machine, and the holder has a mandrel for rotatably holding the roll, the roll comprising wound flat packaging material. The antenna according to the invention preferably is located in the holder which also bears the axis of rotation of the mandrel for the roll of flat packaging material rolling on it. This corresponds to the application explained in the introduction.

The holder with the antenna preferably occupies only a part of the circumference of the roll. This relates to the part of the antenna with the holder, there may be other parts of the holder without an antenna. Preferably the holder with the antenna is L-shaped with an internal angle of about 90° and the occupied part of the circumference of the roll is 90°, respectively.

The apparatus preferably comprises a plurality of holders for a plurality of rolls, wherein the holders each comprise an antenna according to the invention connected to the RFID reader for identifying a respective roll in a holder by a multiplexing method. Each of the antennas preferably comprise at least two linearly polarized individual antennas and a feed circuit which is connected to the individual antennas, wherein the individual antennas are arranged relative to one another with a tilt of an internal angle and together form a circularly polarized antenna, and wherein the antenna has a free space in a region of the internal angle. For example, the apparatus comprises two rolls with mandrel, holder and antenna side by side. Then the additional challenge arises that the respective antenna active during the multiplexing reads the RFID transponder of the correct, assigned roll and not of the other roll. The antenna design according to the invention also contributes in achieving the correct assignment.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
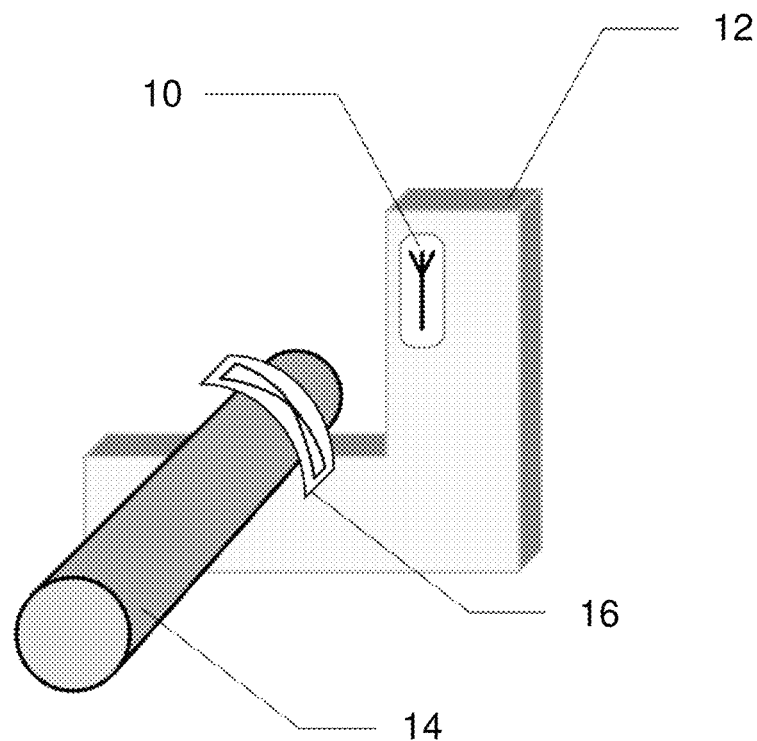
FIG. 1 a schematic three-dimensional view of a roll with an RFID transponder in a holder with an antenna of an RFID reader.

FIG. 1 returns to the application example of the introduction in a generalized way and shows an antenna 10 integrated in a holder 12. In a very schematic illustration, a roll 14 is arranged in the holder 12. An RIFD reader, not shown, has the task of reading an RFID transponder 16 of roll 14 by means of antenna 10 in order to identify roll 14.

Figure 2:
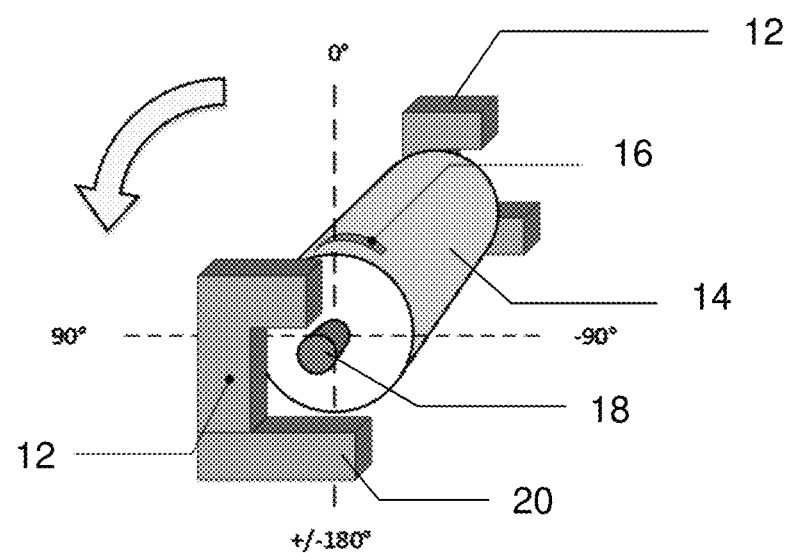
FIG. 2 another schematic three-dimensional view of the roll rotating in the holder.

FIG. 2 is another illustration of the roll 14 rotating relative to the holder 12. The antenna 10 is arranged in the plastic holder 12 and therefore not shown. The roll 14 rotates on a metallic shaft 18 which is also called mandrel. In addition to the L-shaped holder 12 with the antenna 10, there may be other retaining elements 20 which for example additionally support the mandrel or form the connection to the higher-level machine. The RFID transponder 16 is usually not on the outside as in the simplified illustration, but on the inside of the roll 14 or at least underneath the material wound up on the roll 14.

Figure 3:
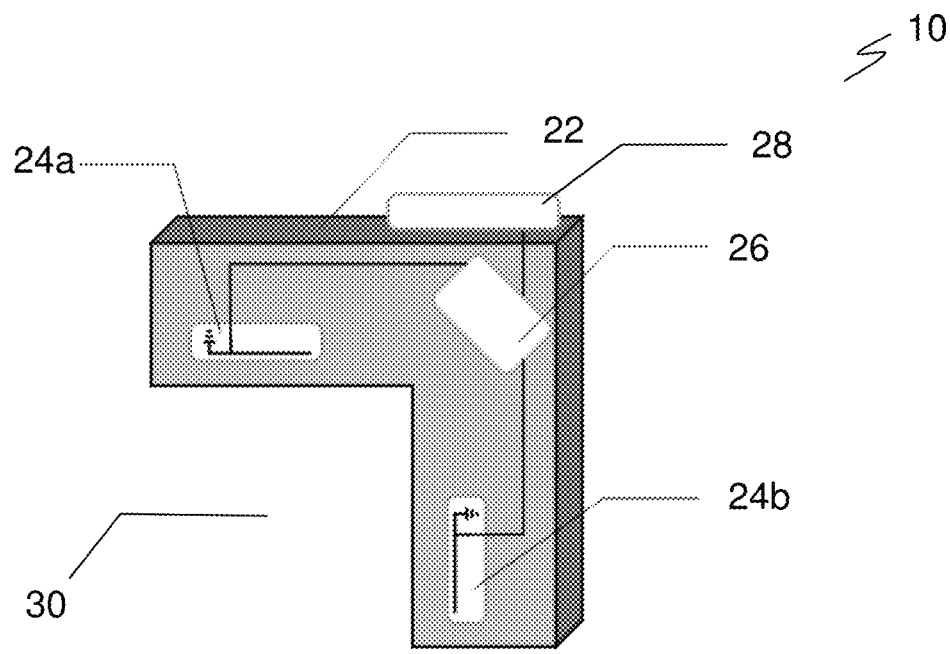
FIG. 3 a schematic representation of an embodiment of an antenna for an RFID reader with two individual antennas tilted at an internal angle to one another.

The particular challenge now is to read the RIFD transponder 16 at any angular position of the roll 14. Identification should remain independent of the rotation of roll 14 and thus also be possible prior to rotation of the roll 14 and in fast rotation, respectively. Antenna 10 is located inside the L-shaped holder 12 at one end of shaft 18. The maximal available volume is structurally determined by the machine. The position of the RFID transponder 16 may be very unfavorable depending on the angular position, since there are shielding effects due to the metallic shaft 18 and possibly a metallic layer of material wound on the roll 14. This is similar to the structure of a coaxial line, but with the RFID transponder 16 being attached to the outer shield surface. This strongly limits the communication capability of the RIFD transponder 16, and interference-free communication is only possible with an optimized antenna 10. If a material without metal is wound on the roll 14 and/or the shaft 18 is not made of metal, the problem is simplified and also easily solved by the antenna 10 according to the invention FIG. 3 shows the schematic structure of an embodiment of the antenna 10. Two linearly polarized individual antennas 24a-b are arranged in a housing 22. The housing 22 may be identical to the holder 12, integrated into it, or attached to it. The individual antennas 24a-b are controlled via a feed circuit 26, for example with a power divider. The feed circuit 26 is connected to a connector 28 of antenna 10 for an RFID reader.

The two individual antennas 24a-b in this embodiment are inverted-F antennas. One arm of the respective individual antenna 24a-b corresponding to the main bar of the F-shape is connected to the feed circuit 26 via a feed line which forms the lower transverse bar of the F-shape. In a variation of a monopole antenna, an additional short circuit is provided next to the feed line, which forms the upper transverse line of the F-shape. The length of a monopole antenna, with reference to a same frequency, can thus significantly be reduced. Inverted-F antennas can be built up in a particularly compact design as PIFA (Planar inverted-F antenna). As an alternative to inverted-F antennas, other linearly polarized antennas are also be conceivable. These include monopole antennas, if the structural disadvantages are accepted, CLL antennas as in EP 3 217 472 A1 mentioned in the introduction, or PIC antennas (planar inverted cone antenna).

In order to meet the challenge of reading RFID transponders 16 at any angular position of the roll 14, the individual antennas 24a-b together should generate a circularly polarized field. Antenna 10 as a whole is thus circularly or at least elliptically and thus approximately circularly polarized. Conventional circularly polarized antennas could not be used under the given structural boundary conditions, because they do not have the free space 30 for the roll 14 left open by the antenna 10 according to the invention.

Figure 8:
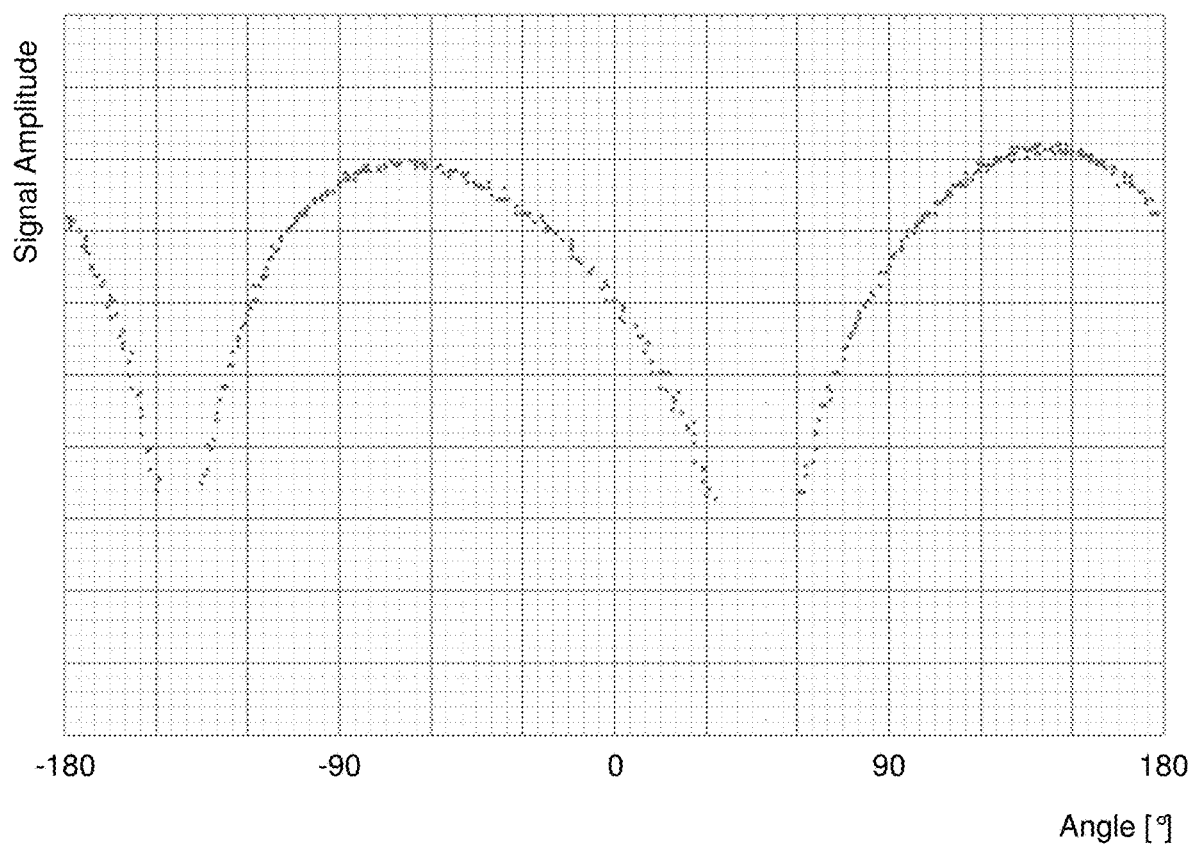
FIG. 8 a representation of the signal strength of an RFID transponder on a roll as a function of its angular position when using a conventional antenna.

The antenna 10 allows the roll 14 to be placed in the free space 30 inside the L-shape of the housing 22. The circularly polarized field in this inner angle or included angle of the free space 30 generates a quite homogeneous and sufficiently low attenuation of the radio signal in contrast to the situation in FIG. 8, independent of the angular position of the roll 14. This means that an RFID transponder 16 can also be read via antenna 10 in angular positions in which communication would no longer be possible with conventional antennas having only linear polarization.

Usually, a feed circuit 26 for a circular polarization from a plurality of linearly polarized individual antennas 24a-b generates a phase shift which for example corresponds to the mutual tilting. This is also conceivable according to the invention.

However, antenna 10 as shown in FIG. 3 has another preferred feature, namely that the individual antennas 24a-b are jointly aligned in the direction of rotation of the desired circular polarization. In other words, the base points of the inverted-F antennas are each aligned clockwise, or the two individual antennas 24a-b can be transformed into one another by translation and clockwise rotation without mirroring.

This common alignment of the individual antennas 24a-b allows the individual antennas 24a-b to be controlled in phase. Surprisingly, the desired circular polarization is already achieved without a phase shift by the feed circuit 26. The in-phase control has the advantage that the feed circuit 26 can be configured much simpler and more compact. The angle between the individual antennas 24ab should at least be less than 180°. This means that the individual antennas 24a-b are mounted on the inside as shown. An arrangement on the outside would result in an obtuse angle greater than 180°, and in that case, the common alignment of the individual antennas 24a-b in the direction of rotation alone would no longer be sufficient for circular polarization. Instead, a phase shift of the feed circuit 26 would again be necessary. In FIG. 3, the angle is a preferred 90°, where the greatest advantageous effect and thus the best axis ratio can be expected.

Figure 4:
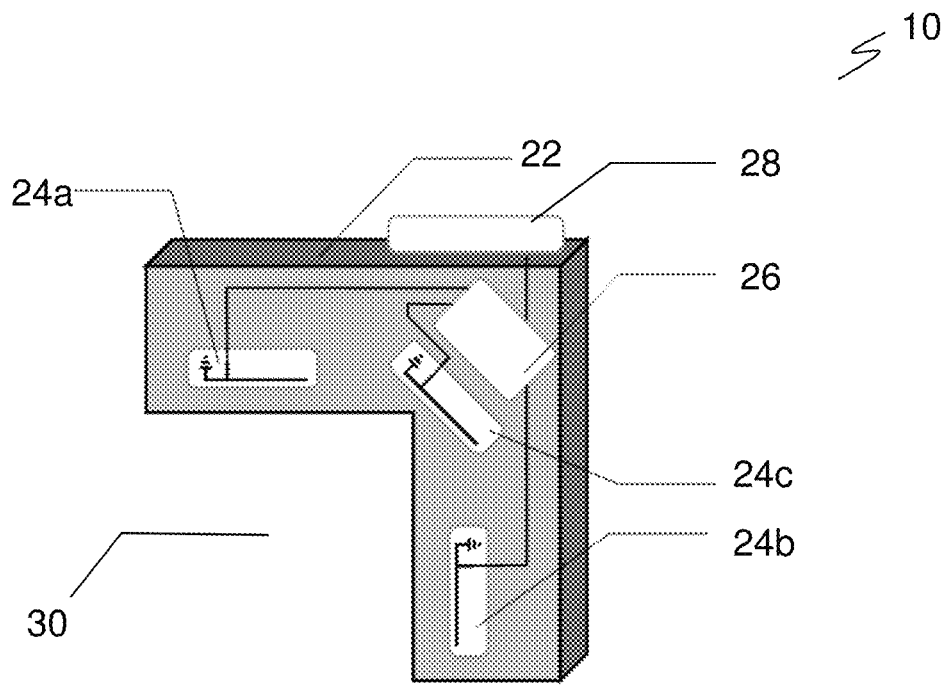
FIG. 4 a schematic representation of another embodiment of an antenna similar to FIG. 3 with an additional individual antenna between the two individual antennas.

FIG. 4 shows a further embodiment of antenna 10. Supplementing the antenna 10 explained with reference to FIG. 3, an additional third individual antenna 24c is provided. The third individual antenna 24c is arranged between the other two individual antennas 24a-b with a tilt of about 45°. The three individual antennas 24a-c thus evenly divide the L-shape of the housing both in arrangement and angle, although it is also possible to deviate from this advantageous arrangement and tilt in other embodiments. The additional individual antenna 24c provides an even lower and therefore better axis ratio. Additional fourth and further individual antennas are conceivable.

Figure 5:
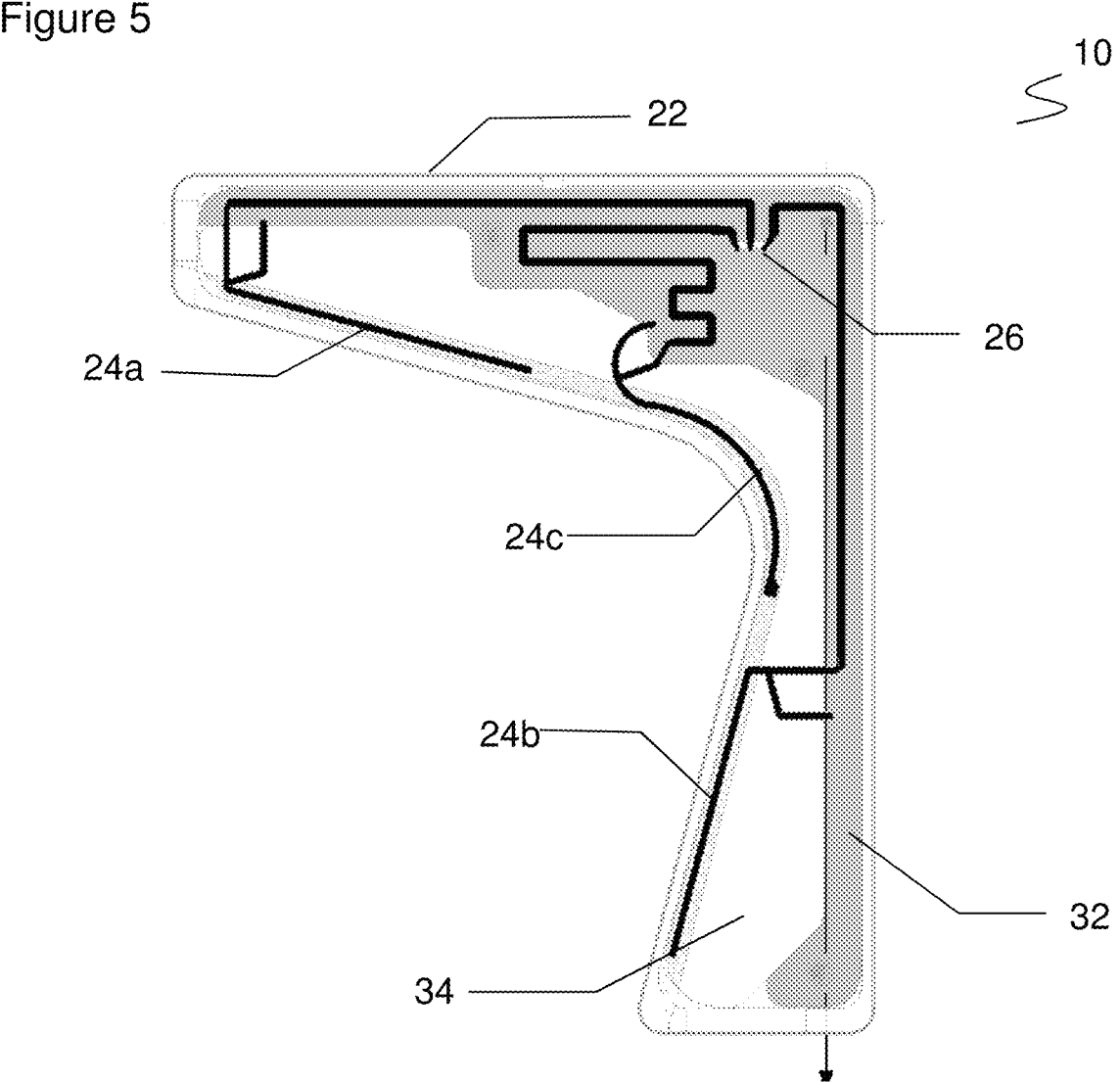
FIG. 5 a representation of an exemplary antenna design for the schematic representation shown in FIG. 3.

FIG. 5 shows a representation of the antenna 10 in a specific exemplary design. The L-shape of the housing 22 is slightly tilted and rounded to better function as a holder 12, or to adapt to the shape of a holder 12. The feed lines of the individual antennas 24a-c as well as the feed circuit 26 are located on a circuit board 32. In the lower part of the housing 22 a common ground plane 34 of the individual antennas 24a-c is provided. The ground plane 34 can be configured as a three-dimensional structure, for example as a milled part made of aluminium. The ground plane 34 preferably forms a reflector behind the arms of the individual antennas 24a-c to support the radiation of the antenna 10 in the desired direction. An alternative two-dimensional structure is also conceivable.

In this design, flat individual antennas 24a-c are used (PIFA). The advantage of this two-dimensional variant is that the complete antenna structure can be manufactured on one board. However, non-plane inverted-F antennas are also conceivable. The feed line of the F-structure of the antenna arm and/or the short circuit line would then be arranged in an additional spatial plane. The other alternative antenna forms already mentioned above would also be possible.

Figure 6:
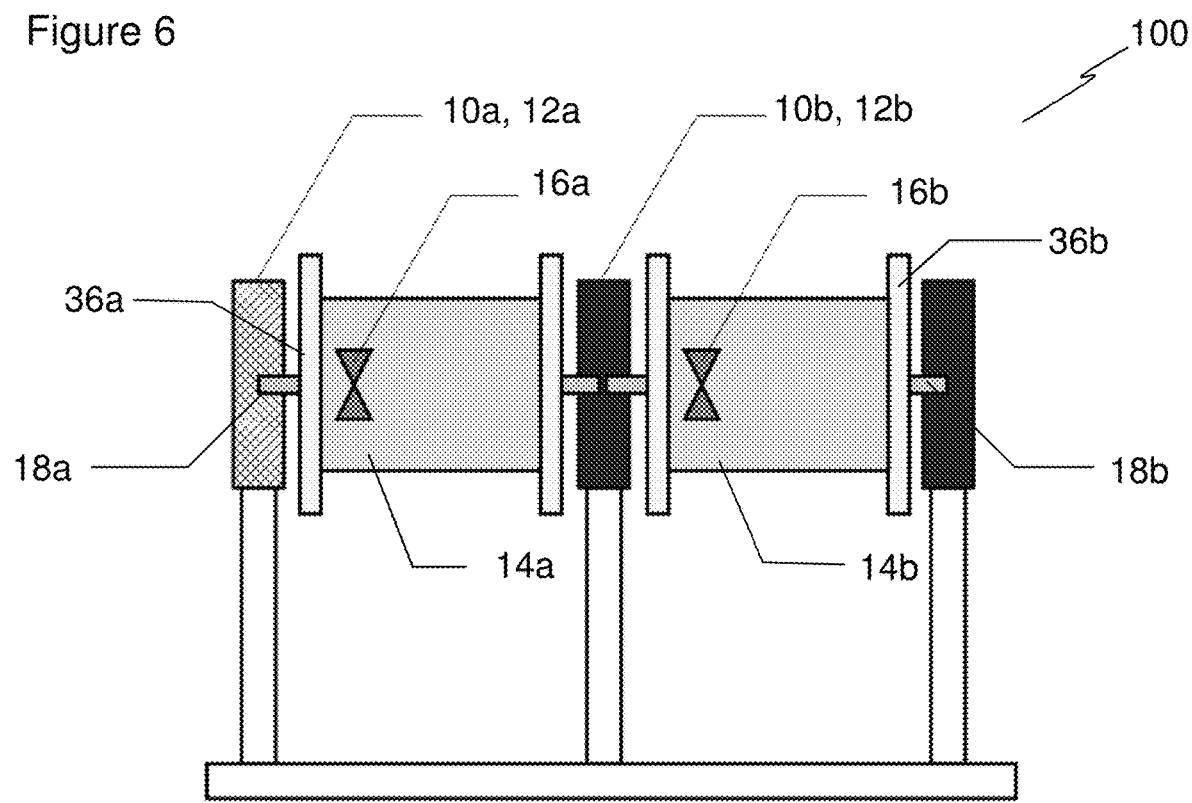
FIG. 6 a schematic representation of a packaging machine having two rolls and two antennas operated in multiplex mode for the identification of the rolls.
Figure 7:
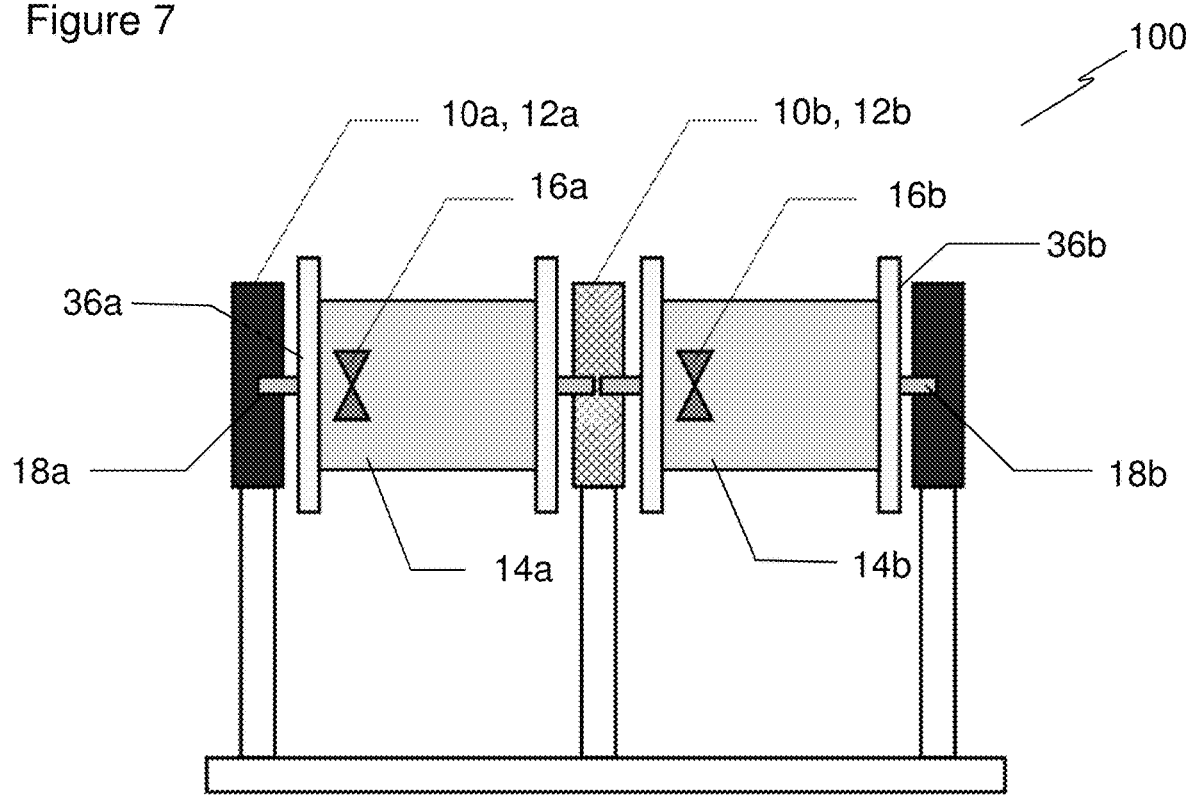
FIG. 7 a schematic representation according to FIG. 6, wherein the active antenna now has changed during the multiplexing process.

FIGS. 6 and 7 show an apparatus 100, for example a packaging machine, with two rolls 14a-b next to one another, both to be identified by their RFID transponders 16a-b. Two antennas 10a-b are provided in the respective holders 12a-b. The rolls 14a-b are unwound on a respective mandrel with shaft 18a-b and spacers 36a-b stabilizing the position of the roll 14a-b.

This poses the additional challenge of not inadvertently reading the RFID transponder 16a-b of the wrong roll 14b-a. Corresponding challenges arise when more than two roles 14a-b are provided and these are in different orientations and arrangements than side by side.

The antennas 10a-b are preferably both connected to the same RFID reader, for example to separate ports of the RFID reader, and are activated alternately in a multiplex process so that the reading processes do not interfere with each other. In FIG. 6, the left antenna 10a is active to identify the left roll 14a, in FIG. 7 the other antenna 10b arranged in the middle is active to identify the right roll 14b. Of course, the other antenna 10b could also be placed on the right, but in that case adjustments would be necessary, like a mirrored construction, and it would not be possible to simply duplicate the holder 12a-b together with antenna 10a-b.

By activating one respective antenna 10a-b, each roll 14a-b can uniquely be identified via its RFID transponder 16a-b. It would be conceivable to provide shield elements between antenna 10b and roll 14a to help avoid confusion.

The invention claimed is:

1. An antenna (10) for an RFID reader, the antenna (10) comprising at least two linearly polarized individual antennas (24a b) and a feed circuit (26) which is connected to the individual antennas (24a b),
wherein the individual antennas (24a b) are arranged relative to one another with a tilt of an internal angle and together form a circularly polarized antenna,
wherein the antenna (10) has a free space (30) in a region of the internal angle,
and wherein the antenna (10) is arranged in an L-shaped housing (12, 22) whose legs form the internal angle.

2. The antenna (10) according to claim 1,
wherein the internal angle is a right angle.

3. The antenna (10) according to claim 1,
further comprising at least one additional linearly polarized individual antenna (24c) at an angle smaller than the internal angle to the two individual antennas (24a b).

4. The antenna (10) according to claim 3,
wherein the additional individual antenna (24c) is arranged between the two individual antennas (24a b).

5. The antenna (10) according to claim 1,
wherein the individual antennas (24a b; 24a c) are jointly aligned clockwise or jointly aligned counterclockwise, and wherein the feed circuit (26) drives the individual antennas (24a b; 24a c) in phase.

6. The antenna (10) according to claim 1,
wherein the individual antennas (24a c) are antennas of the inverted F antenna type.

7. An apparatus (100) with an RFID reader and with a holder (12, 18) for a roll (14),
wherein the holder (12) has at least one antenna (10) which is connected to the RFID reader in order to read an RFID transponder (16) of the roll (14) held by the holder (12, 18) and thus identify the roll (14),
wherein the antenna (10) comprises at least two linearly polarized individual antennas (24a b) and a feed circuit (26) which is connected to the individual antennas (24a b),
wherein the individual antennas (24a b) are arranged relative to one another with a tilt of an internal angle and together form a circularly polarized antenna, and wherein the antenna (10) has a free space (30) in a region of the internal angle,
and wherein the holder (12) with the antenna (10) occupies only a part of the circumference of the roll (14).

8. The apparatus (100) according to claim 7,
wherein the apparatus (100) is configured as a packaging machine and the holder (12, 18) has a mandrel (18, 36) for rotatably holding the roll (14),
and wherein the roll comprises wound flat packaging material.

9. The apparatus (100) according to claim 7,
wherein the occupied part of the circumference of the roll (14) is 90°.

10. The apparatus (100) according to claim 7,
comprising a plurality of holders (12a b, 18a b) for a plurality of rolls (14a b),
wherein the holders (12a b, 18a b) each comprise an antenna (10a b) connected to the RFID reader for identifying a respective roll (14a b) in a holder (12a b, 18a b) by a multiplexing method, each of the antennas (10a b) comprising at least two linearly polarized individual antennas (24a b) and a feed circuit (26) which is connected to the individual antennas (24a b),
wherein the individual antennas (24a b) are arranged relative to one another with a tilt of an internal angle and together form a circularly polarized antenna, and wherein the antenna (10) has a free space (30) in a region of the internal angle.

11. A method for identifying a roll (14) arranged on a mandrel (18, 36) of a holder (12, 18),
wherein an RFID transponder (16) of the roll (14) is read by an RFID reader by means of an antenna (10) of the holder (12, 18) independently of the rotational position of the roll (14), the antenna (10) comprising at least two linearly polarized individual antennas (24a b) and a feed circuit (26) which is connected to the individual antennas (24a b),
wherein the individual antennas (24a b) are arranged relative to one another with a tilt of an internal angle and together form a circularly polarized antenna, and wherein the antenna (10) has a free space (30) in a region of the internal angle,
and wherein the antenna (10) is arranged in an L-shaped housing (12, 22) whose legs form the internal angle.

* * * * *